(12) United States Patent
Smith

(10) Patent No.: US 8,171,733 B2
(45) Date of Patent: May 8, 2012

(54) SYSTEMS AND METHODS INVOLVING COMBINED CYCLE PLANTS

(75) Inventor: Gordon Raymond Smith, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 564 days.

(21) Appl. No.: 12/424,036

(22) Filed: Apr. 15, 2009

(65) Prior Publication Data

US 2010/0263376 A1    Oct. 21, 2010

(51) Int. Cl.
  *F02C 6/00* (2006.01)
  *F02G 1/00* (2006.01)
  *F01K 23/04* (2006.01)
  *F01K 13/00* (2006.01)
(52) U.S. Cl. .......................... 60/655; 60/39.182; 60/676
(58) Field of Classification Search ............... 60/39.182, 60/645–681
  See application file for complete search history.

(56) References Cited

U.S. PATENT DOCUMENTS

| | | | | |
|---|---|---|---|---|
| 3,879,616 A | * | 4/1975 | Baker et al. | 290/40 R |
| 3,955,358 A | * | 5/1976 | Martz et al. | 60/39.182 |
| 4,168,608 A | * | 9/1979 | Uram | 60/773 |
| 4,462,206 A | * | 7/1984 | Aguet | 60/39.182 |
| 4,637,212 A | * | 1/1987 | Aguet | 60/655 |
| 5,109,665 A | * | 5/1992 | Hoizumi et al. | 60/39.182 |
| 2008/0127647 A1 | * | 6/2008 | Leitner | 60/645 |

* cited by examiner

*Primary Examiner* — Thomas Denion
*Assistant Examiner* — Christopher Jetton
(74) *Attorney, Agent, or Firm* — Cantor Colburn LLP

(57) ABSTRACT

A system comprises a first heat recovery steam generator (HRSG) operative to receive steam from a source of steam and output water to the source of steam, a second HRSG operative to receive steam from the source of steam and output water to the source of steam, a first water flow control valve operative to regulate a flow of the water output from the first HRSG to the source of steam, and a second water flow control valve operative to regulate a flow of the water output from the second HRSG to the source of steam.

18 Claims, 5 Drawing Sheets

SYSTEMS AND METHODS INVOLVING COMBINED CYCLE PLANTS

BACKGROUND OF THE INVENTION

The subject matter disclosed herein relates to power generation, and specifically to combined cycle systems.

Combined cycle power plants may use a number of thermal energy sources to produce steam. For example, gas turbine generators may output exhaust to heat recovery steam generators (HRSG) to produce steam. The steam may drive a turbine connected to an electrical generator. Other sources of thermal energy may be used to increase steam output and increase the efficiency of a combined cycle system.

BRIEF DESCRIPTION OF THE INVENTION

According to one aspect of the invention, a system comprises a first heat recovery steam generator (HRSG) operative to receive steam from a source of steam and output water to the source of steam, a second HRSG operative to receive steam from the source of steam and output water to the source of steam, a first water flow control valve operative to regulate a flow of the water output from the first HRSG to the source of steam, and a second water flow control valve operative to regulate a flow of the water output from the second HRSG to the source of steam.

According to another aspect of the invention, a method for controlling a system comprises receiving a value of the flow of steam (FS1) received by a first heat recovery steam generator (HRSG) and a value of the flow of steam (FS2) received by a second HRSG, determining whether FS1 is greater than FS2, regulating a flow of water (FW1) from the first HRSG to meet a desired upper threshold position responsive to determining that FS1 is greater than FS2, calculating a value of a flow of water (FW2) output from the second HRSG as a function of FS1 and FS2, and regulating the flow of the water output from the second HRSG to approximately equal the calculated value of FW2.

According to yet another aspect of the invention, a method for controlling a system comprises receiving a value of the flow of water (FW1) output by a first heat recovery steam generator (HRSG) and a value of the flow of water (FW2) output by a second HRSG, determining whether FW1 is greater than FW2, regulating a flow of steam (FS1) to the first HRSG to meet a desired upper threshold position responsive to determining that FW1 is greater than FW2, calculating a value of a flow of steam (FS2) to the second HRSG as a function of FW1 and FW2, and regulating the flow of the steam to the second HRSG to approximately equal the calculated value of FS2.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The use of heat recovery steam generators (HRSG) to produce steam efficiently utilizes thermal energy from gas turbine engines in a combined cycle steam system. Other sources of thermal energy such as, for example, solar energy, geothermal energy, and "waste" thermal energy from industrial systems may also be used to provide steam in a combined cycle steam system. The integration of alternative sources of thermal energy into a combined cycle steam system becomes complex when a number of HRSGs are used in the system.

Figure 1:
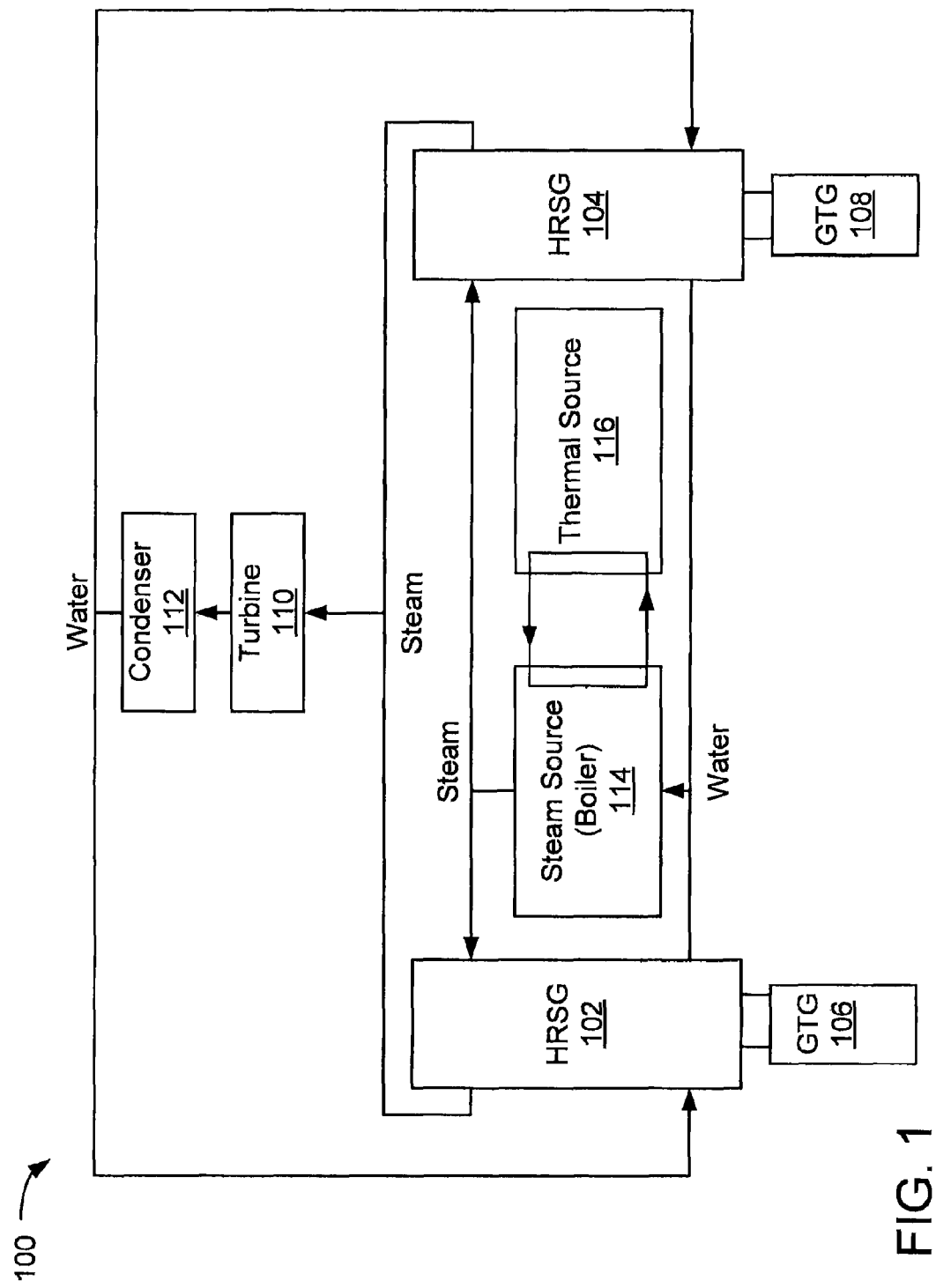
FIG. 1 is a high level block diagram of a combined cycle steam system.

FIG. 1 illustrates a high level block diagram of an exemplary combined cycle steam system 100. The system 100 includes a first HRSG 102 associated with a first gas turbine generator (GTG) 106 and a second HRSG 104 associated with a second GTG 108. The system 100 also includes a turbine 110, a condenser 112, a source of steam (boiler) 114, and a thermal energy source 116. In operation, the GTGs 106 and 108 output exhaust to the HRSGs 102 and 104. The HRSGs 102 and 104 convert water to steam and output the steam to the turbine 110. The steam is output from the turbine 110 to the condenser 112 that converts the steam into water that is input to the HRSGs 102 and 104. The boiler 114 receives water from the condenser 112 via the HRSGs 102 and 104 and converts the water to steam by receiving thermal energy from the thermal energy source 116. The system 100 illustrates an exemplary embodiment. Other embodiments may include a number of different combinations of system components, including any number of HRSGs 102, GTGs 106, turbines 110, condensers 112, and additional associated system components such as, for example, pumps, tanks, and heat exchangers. The source of steam 114 may include a boiler or other type of steam generator or steam source.

Figure 2:
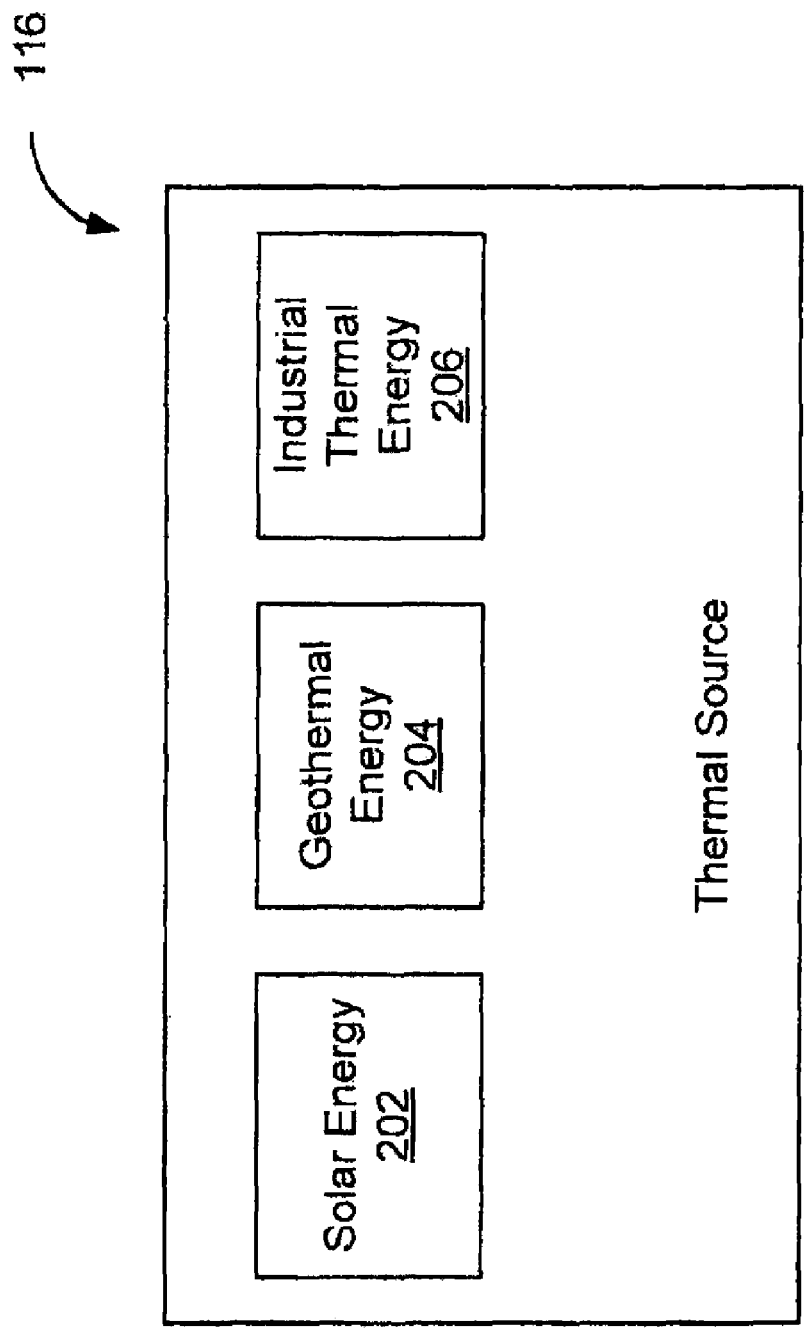
FIG. 2 illustrates examples of thermal energy sources of FIG. 1.

FIG. 2 illustrates examples of thermal energy sources. The thermal energy source 116 may include, for example, a solar energy source 202, a geothermal energy source 204, or an industrial thermal energy source 206. An exemplary solar energy source 202 may include, for example, a solar array that reflects solar energy to a heat exchanger that heats a fluid. An exemplary geothermal energy source may include, for example, a heat exchanger that heats a fluid using geothermal energy. An exemplary industrial thermal energy source 206 may include, for example, heated fluid resulting from an industrial process such as a chemical or mechanical manufacturing process and exchanged in a heat exchanger. These and other types of thermal energy sources may be used alone or in combination to provide the thermal energy source 116.

Referring to FIG. 1, a typical thermal energy source 116 provides inexpensive thermal energy to the system 100. Thus, in the operation of the system 100, it is desirable to allow the boiler 114 to produce steam at a rate that corresponds to the amount of available energy output by the thermal energy source 116. To produce steam at a desired rate, the boiler 114 draws water from the HRSGs 102 and 104 in the system 100 and outputs an amount of steam corresponding to the amount of water input to the boiler 114 to the HRSGs 102 and 104. If, for example, the system 100 operates with only the first HRSG 102, the draw of the water from the first HRSG 102 to the boiler 114 is mass balanced by the output of steam from the boiler 114 to the first HRSG 102. However, if both of the HRSGs 102 and 104 are operating for example, the boiler 114 may receive a first amount water from the first HRSG 102 and send a different amount of steam back to the first HRSG 102—unbalancing the mass of water and steam of the first HRSG 102 and the second HRSG 104 (the difference of the mass of steam and water is output and input to the second HRSG 104). It is undesirable to operate an HRSG system with unbalanced masses of water and steam. Thus, a system and method that allows a boiler to operate using the thermal energy source 116 while keeping the water and steam input and output from multiple HRSGs mass balanced in the system is described below.

Figure 3:
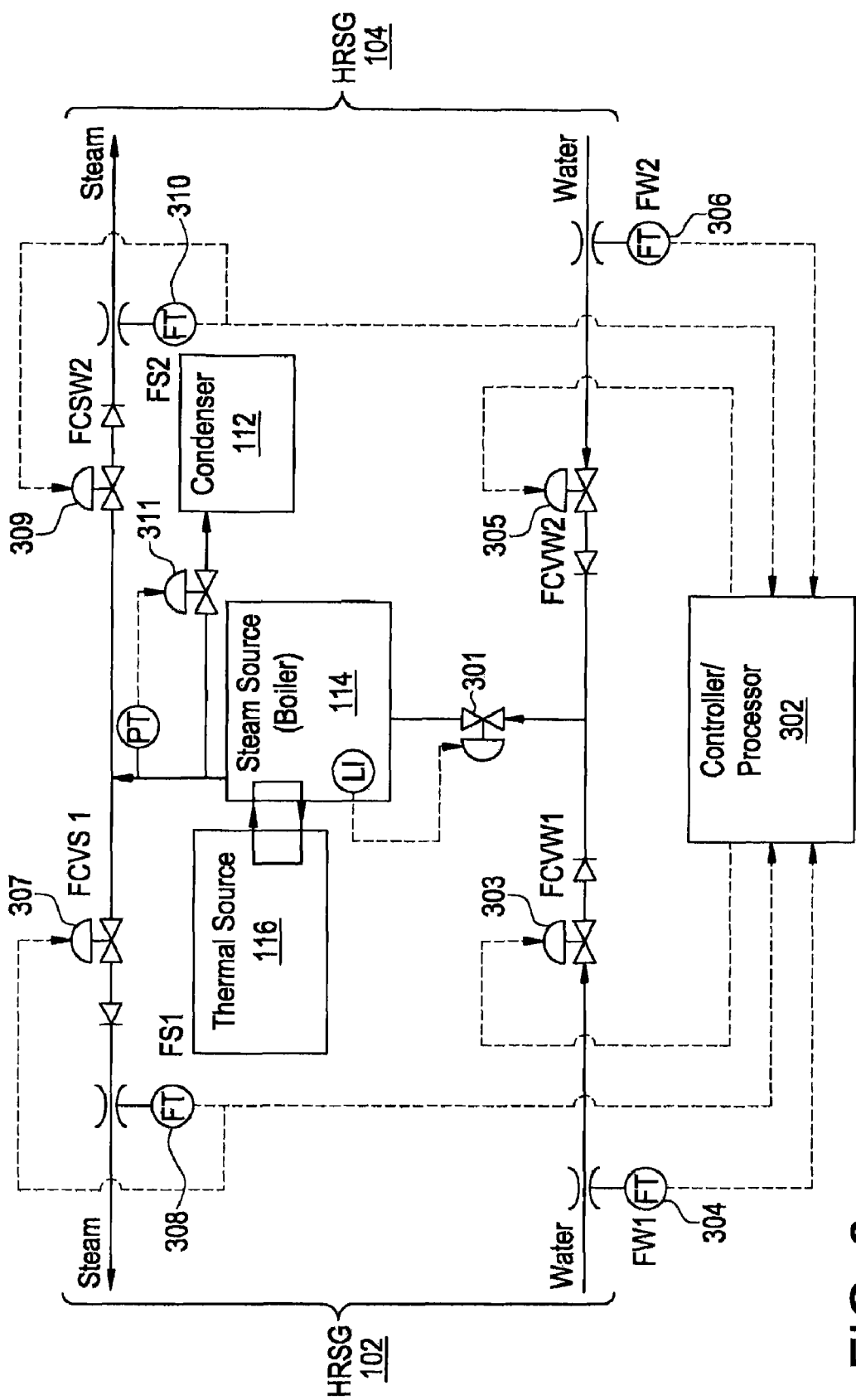
FIG. 3 is a system diagram further illustrating the system.

FIG. 3 illustrates a more detailed system diagram of the system 100 (of FIGS. 1 and 2). The system includes a controller (processor) 302 that may include, for example a processor, memory, and input and output device. The system also includes a number of valves and sensors that will be described below.

In operation, the boiler 114 includes a boiler water level indicator (LI) that determines the amount of boiler water in the boiler 114. A water flow control valve 301 is operative to regulate the flow of boiler water into the boiler 114 to maintain a desired boiler water level. Water in the boiler 114 is converted to steam by a heat transfer of the thermal energy received from the thermal energy source 116 and output from the boiler 114. The amount of thermal energy available from the thermal energy source may vary (i.e. a solar array used as a thermal energy source outputs more thermal energy as the sun rises), however since the thermal energy source provides inexpensive thermal energy, it is desirable for the boiler 114 to draw boiler water in the system at a rate that will maintain the desired boiler water level regardless of the increase (or decrease) in energy provided by the thermal energy source 116. A bypass flow control valve 311 may be connected to the steam output of the boiler 114 to direct the steam output from the boiler 114 to the condenser 112 in some operating conditions.

The flows of the water output from the HRSGs 102 and 104 are determined by the sensors 304 and 306—the values indicated as (FW1) and (FW2) respectively. The flows of steam output from the boiler to the HRSGs 102 and 104 are determined by the sensors 308 and 310—the values indicated as (FS1) and (FS2) respectively. The values of the water flows and steam flows are received by the processor 302. The water flow control valves FCVW1 303 and FCVW2 305 and the steam flow control valves FCVS1 307 and FCVS1 309 are operative to control the flows of water and steam and may be controlled by the processor 302.

By receiving the flow values of the water output from the HRSGs 102 and 104, and the steam input to the HRSGs 102 and 104, and controlling the flow control valves, the processor is operative to maintain a mass balanced system with respect to the water to steam ratios of the HRSGs 102 and 104 that may be independent of, and not interfere with the control of the total value of water flow into the boiler 114 by the water flow control valve 301.

In this regard, exemplary logic used by the processor 302 to maintain mass balance between the HRSGs includes the function: FW1/FW2=FS1/FS2. Maintaining the ratio maintains the mass balance between the HRSGs. In this example of efficient operation, it is desirable to fully open at least one of the water flow control valves (303 and 305) and to fully open both of the steam flow control valves (307 and 309), (Though the water and steam flow control valves may be in a variety of positions if desired. The use of the term "fully open" is for exemplary purposes and may be used to indicate a desired upper threshold flow rate position for a valve in the system e.g., 100% or less than 100%.).

Figure 4:
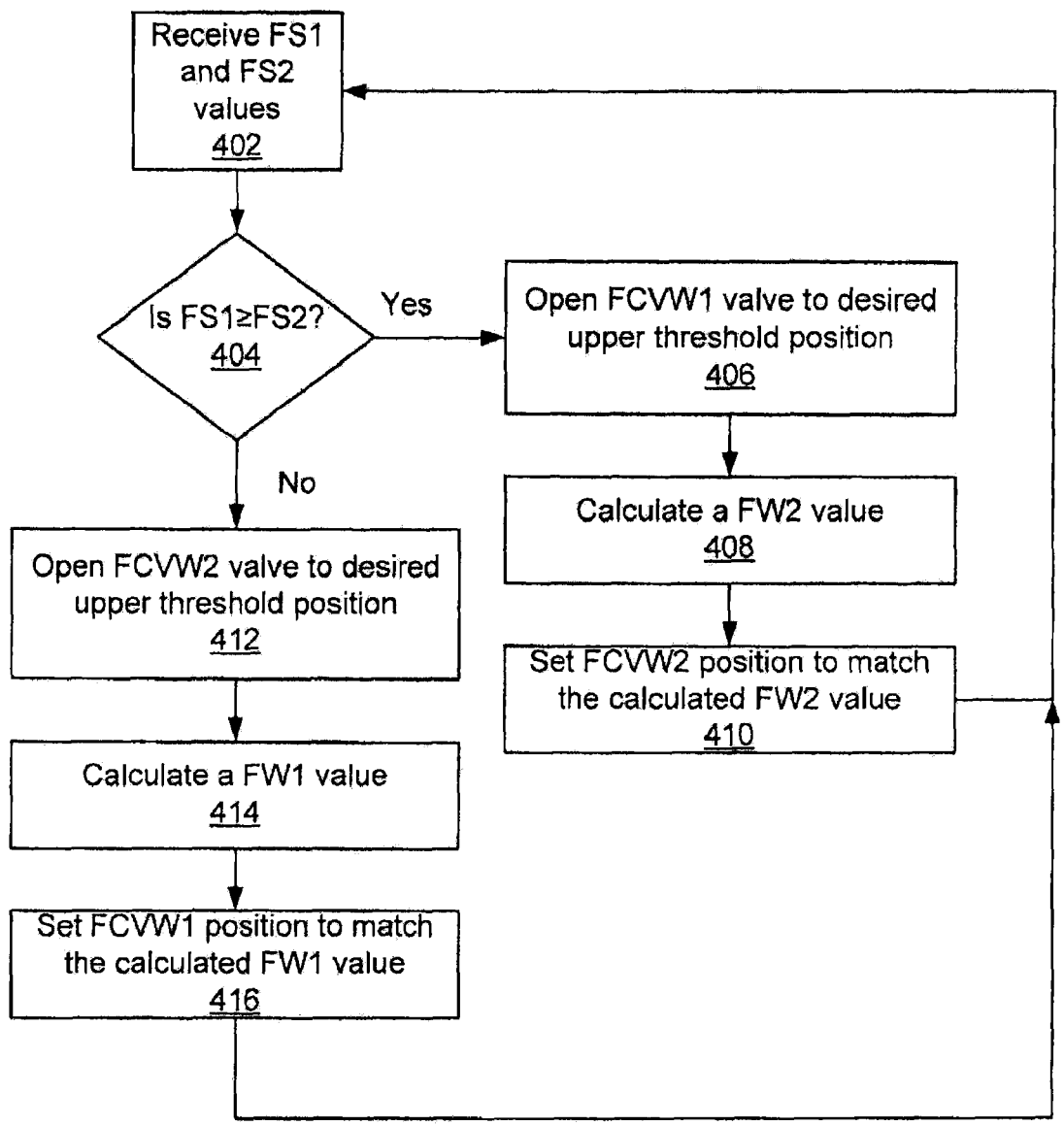
FIGS. 4 and 5 are block diagrams illustrating exemplary methods for controlling the system of FIG. 1.

FIG. 4 illustrates a flow diagram of an exemplary logic. In block 402, the values of FS1 and FS2 are received. In block 404, the values FS1 and FS2 are compared. Thus, if FS1≧FS2, than the water flow control valve FCVW1 303 is directed by the processor 302 to open to a desired upper threshold position in block 406. In block 408, the processor 302 solves the function FW1/FW2=FS1/FS2 for the value of FW2 where FW2=FW1(FS2/FS1). In block 410, the calculated value of FW2 is used to set the position of the water flow control valve FCVW2 305 to regulate the associated water flow to match the calculated FW2 value. Similarly, if FS2>FS1 in block 404, than the water flow control valve FCVW2 305 is directed by the processor 302 to open to a desired upper threshold position in block 412. In block 414, the processor 302 solves for the value of FW1 where FW1=FW2 (FS1/FS2). The calculated value of FW1 is used to set the position of the water flow control valve FCVW1 303 to regulate the associated water flow to match the calculated FW1 value in block 416.

Figure 5:
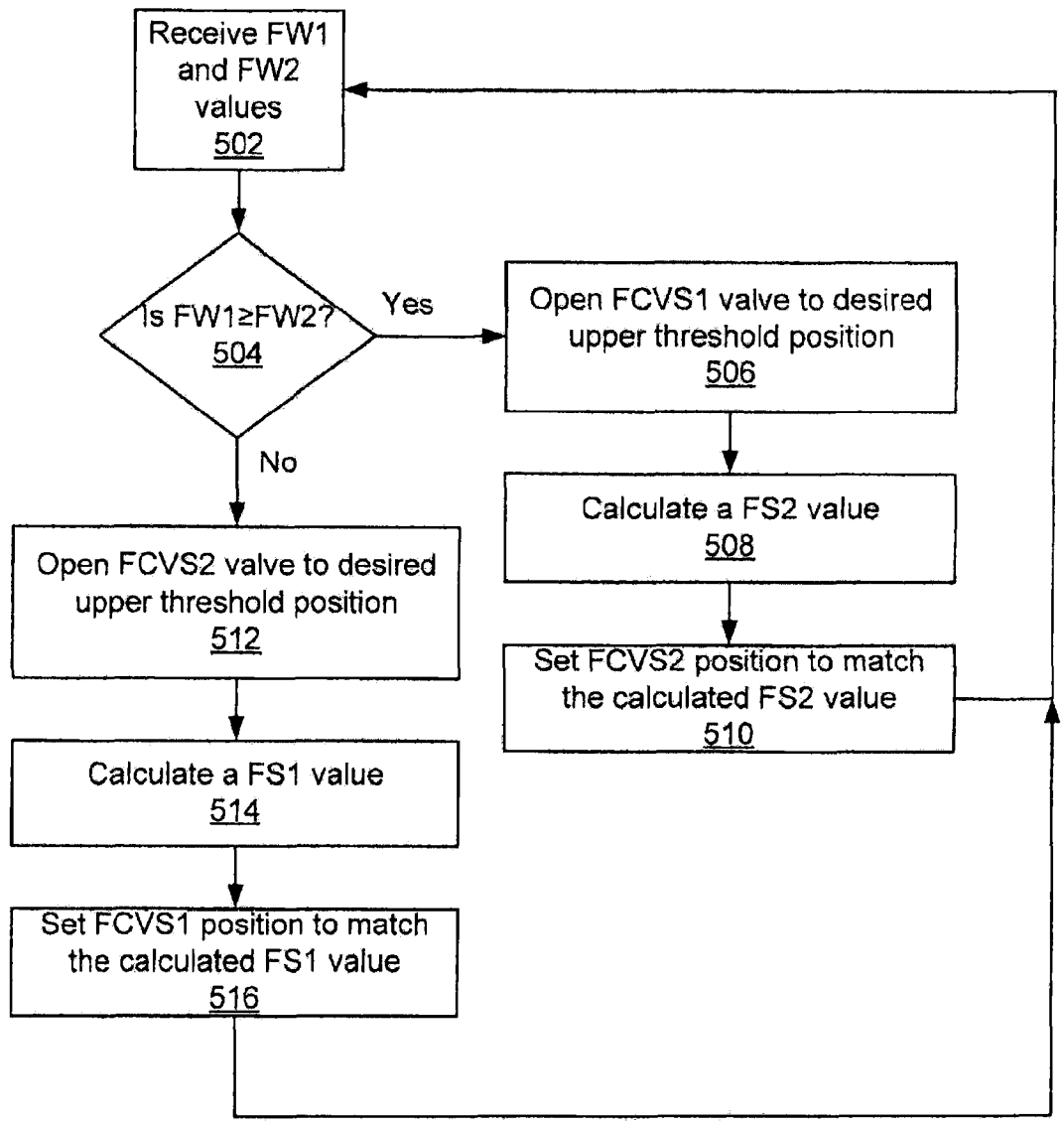

FIG. 5 illustrates a block diagram of an alternate exemplary logic that may be used to maintain mass balance in the system by regulating the flow of steam. In this regard, in block 502, the FW1 values and FW2 values are received. The function FW1/FW2=FS1/FS2 is maintained by comparing the FW1 and FW2 values such that in block 504 FW1≧FW2 is determined. If yes, than the steam flow control valve FCVS1 307 is directed by the processor 302 to open to a desired upper threshold position in block 506. In block 508, the processor 302 solves the ratio FW1/FW2=FS1/FS2 for the value of FS2 where FS2=FS1(FW2/FW1). The calculated value of FS2 is used to set the position of the steam flow control valve FCVS2 309 to regulate the associated steam flow to match the calculated FS2 value in block 510. If FW2>FW1 in block 504, than the water flow control valve FCVS2 309 is directed by the processor 302 to open to a desired upper threshold position in block 512. In block 514, the processor 302 solves for the value of FS1 where FS1=FW1(FS2/FS1). The calculated value of FS1 is used to set the position of the steam flow control valve FCVS1 307 to regulate the associated steam flow to match the determined FS1 value in block 516.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. A system comprising:
a first heat recovery steam generator (HRSG) operative to receive steam from a source of steam and output water to the source of steam;
a second HRSG operative to receive steam from the source of steam and output water to the source of steam;
a first water flow control valve operative to regulate a flow of the water output from the first HRSG to the source of steam; and a second water flow control valve operative to regulate a flow of the water output from the second HRSG to the source of steam.

2. The system of claim 1, wherein the system further comprises a processor having logic operative to maintain a mass balance between the water output to the source of steam from the first HRSG and the steam received by the first HRSG and the water output to the source of steam from the second HRSG and the steam received by the second HRSG by controlling the first water flow control valve and the second water flow control valve.

3. The system of claim 1, wherein the system further comprises a processor operative to receive a value of the flow of steam (FS1) received by the first HRSG from the source of steam and a value of the flow of steam (FS2) received by the second HRSG from the source of steam, determine whether FS1 is greater than FS2, send a signal operative to open the first water flow control valve to a desired upper threshold position responsive to determining that FS1 is greater than FS2, calculate a value of the flow of the water (FW2) output from the second HRSG to the source of steam as a function of FS1 and FS2, and send a signal to the second water flow control valve to regulate the flow of the water output from the second HRSG to the source of steam to approximately equal the calculated value of FW2.

4. The system of claim 3, wherein the function of FS1 and FS2 is FW1/FW2=FS1/FS2.

5. The system of claim 3, wherein the desired upper threshold position is open.

6. The system of claim 1, wherein the system further comprises a processor operative to receive a value of the flow of steam (FS1) received by the first HRSG from the source of steam and a value of the flow of steam (FS2) received by the second HRSG from the source of steam, determine whether FS1 is greater than FS2, send a signal operative to open the second water flow control valve to a desired upper threshold position responsive to determining that FS1 is not greater than FS2, calculate a value of the flow of the water (FW1) output from the first HRSG to the source of steam as a function of FS1 and FS2, and send a signal to the first water flow control valve to regulate the flow of the water output from the first HRSG to the source of steam to approximately equal the calculated value of FW1.

7. The system of claim 1, wherein the source of steam includes a boiler operative to convert water to steam.

8. The system of claim 1, wherein the source of steam is operative to receive thermal energy from a solar array system.

9. The system of claim 1, wherein the source of steam is operative to receive thermal energy from a geothermal system.

10. The system of claim 1, wherein the source of steam is operative to receive thermal energy from a heat exchanger.

11. A method for controlling a system comprising:
receiving a value of the flow of steam (FS1) received by a first heat recovery steam generator (HRSG) and a value of the flow of steam (FS2) received by a second HRSG;
determining whether FS1 is greater than FS2;
regulating a flow of water (FW1) from the first HRSG to meet a desired upper threshold position responsive to determining that FS1 is greater than FS2;
calculating a value of a flow of water (FW2) output from the second HRSG as a function of FS1 and FS2; and
regulating the flow of the water output from the second HRSG to approximately equal the calculated value of FW2.

12. The method of claim 11, wherein the method further comprises:
regulating the flow of water (FW2) from the second HRSG to meet a desired upper threshold position responsive to determining that FS1 is not greater than FS2.

13. The method of claim 12, wherein the method further comprises:
calculating a value of a flow of water (FW1) output from the first HRSG as a function of FS1 and FS2; and
regulating the flow of the water output from the first HRSG to approximately equal the calculated value of FW1.

14. The method of claim 13, wherein the function of FS1 and FS2 is FW1/FW2=FS1/FS2.

15. A method for controlling a system comprising:
receiving a value of the flow of water (FW1) output by a first heat recovery steam generator (HRSG) and a value of the flow of water (FW2) output by a second HRSG;
determining whether FW1 is greater than FW2;
regulating a flow of steam (FS1) to the first HRSG to meet a desired upper threshold position responsive to determining that FW1 is greater than FW2;
calculating a value of a flow of steam (FS2) to the second HRSG as a function of FW1 and FW2; and
regulating the flow of the steam to the second HRSG to approximately equal the calculated value of FS2.

16. The method of claim 15, wherein the method further comprises:
regulating the flow of steam (FS2) to the second HRSG to meet a desired upper threshold position responsive to determining that FW1 is not greater than FW2.

17. The method of claim 16, wherein the method further comprises:
calculating a value of a flow of steam (FS1) to the first HRSG as a function of FW1 and FW2; and
regulating the flow of the steam to the first HRSG to approximately equal the calculated value of FS1.

18. The method of claim 17, wherein the function of FW1 and FW2 is FW1/FW2=FS1/FS2.

* * * * *